(12) United States Patent  
Mizukawa et al.

(10) Patent No.: US 8,111,142 B2  
(45) Date of Patent: Feb. 7, 2012

(54) NON-CONTACT ID TAG WRITING APPARATUS FOR ENABLING HIGH-SPEED DATA WRITING INTO A PLURALITY OF NON-CONTACT ID TAGS

(75) Inventors: Takaaki Mizukawa, Hiroshima (JP); Kazuhiko Noda, Ichinomiya (JP)

(73) Assignees: Miyake, Inc., Hiroshima-Shi, Hiroshima-Ken (JP); Iwata Label Co., Ltd., Ichinomiya-Shi, Aichi-Ken (JP)

( * ) Notice: Subject to any disclaimer, the term of this patent is extended or adjusted under 35 U.S.C. 154(b) by 909 days.

(21) Appl. No.: 10/592,837

(22) PCT Filed: Mar. 11, 2005

(86) PCT No.: PCT/JP2005/004339  
§ 371 (c)(1), (2), (4) Date: Sep. 14, 2006

(87) PCT Pub. No.: WO2005/088525  
PCT Pub. Date: Sep. 22, 2005

(65) Prior Publication Data  
US 2008/0231419 A1     Sep. 25, 2008

(30) Foreign Application Priority Data  
Mar. 15, 2004   (JP) .................... 2004-073203

(51) Int. Cl.  
*H04Q 5/22* (2006.01)

(52) U.S. Cl. .............. 340/10.51; 340/10.5; 340/673; 340/676; 700/112; 700/230

(58) Field of Classification Search .......... 340/10.51, 340/10.1–10.3, 10.5, 10.52, 3.22, 3.23, 3.24, 340/3.42, 673–676; 700/11, 23, 108, 111, 700/112, 213, 225, 227–230; 235/375–385, 235/462.17–462.18  
See application file for complete search history.

(56) References Cited

U.S. PATENT DOCUMENTS

| | | | | |
|---|---|---|---|---|
| 4,941,181 A | * | 7/1990 | Igarashi et al. | 382/100 |
| 6,104,291 A | * | 8/2000 | Beauvillier et al. | 340/572.1 |
| 6,246,326 B1 | * | 6/2001 | Wiklof et al. | 340/572.1 |
| 6,342,830 B1 | * | 1/2002 | Want et al. | 340/10.1 |

(Continued)

FOREIGN PATENT DOCUMENTS  
JP     5-81485     4/1993  
(Continued)

OTHER PUBLICATIONS  
Office Action in JP 2004-073203 dated Jul. 31, 2009.

*Primary Examiner* — Daniel Wu  
*Assistant Examiner* — Nay Tun  
(74) *Attorney, Agent, or Firm* — Buchanan Ingersoll & Rooney PC

(57) ABSTRACT

A non-contact ID tag writing apparatus capable of applying high-speed writing to a non-contact ID tag is realized. With a plurality of antennas (221 to 223) arranged along the direction in which tags (11) are transported, one antenna applies writing to one of the tags while the tags pass through the coverage area of the antenna. The antennas apply the writing to the respective tags different from one another, whereby the writing can be applied to all the tags in a row.

4 Claims, 9 Drawing Sheets

U.S. PATENT DOCUMENTS

| | | | |
|---|---|---|---|
| 7,176,799 B1 * | 2/2007 | Golicz et al. | 340/572.1 |
| 2004/0036623 A1 * | 2/2004 | Chung | 340/825.49 |
| 2004/0070503 A1 * | 4/2004 | Monahan | 340/572.7 |

FOREIGN PATENT DOCUMENTS

| | | |
|---|---|---|
| JP | 11-96319 | 4/1999 |
| JP | 2000-134140 | 5/2000 |
| JP | 2000-242738 | 9/2000 |
| JP | 2001-118036 | 4/2001 |
| JP | 2002-230499 | 8/2002 |
| JP | 2003-76947 | 3/2003 |
| JP | 2003076947 A * | 3/2003 |

* cited by examiner

NON-CONTACT ID TAG WRITING APPARATUS FOR ENABLING HIGH-SPEED DATA WRITING INTO A PLURALITY OF NON-CONTACT ID TAGS

TECHNICAL FIELD

The present invention relates to a technique for writing predetermined data at high speed in writable non-contact ID tags.

BACKGROUND ART

In recent years, a trend has been activated in which non-contact ID tags that are called "wireless ID tags" or "RFID (Radio Frequency Identification) tags" are applied to production management and distribution management. A non-contact ID tag (may be simply referred to as a tag, hereinafter) is configured of an antenna, a memory and peripheral circuits of the memory. It is possible to access the memory of the tag from outside by, through a reader/writer, communicating with the tag (e.g., refer to Japanese Patent Laid-Open No. 2000-134140).

DISCLOSURE OF THE INVENTION

Problems to be Solved by the Invention

In the case where non-contact ID tags as described above is utilized, e.g., for product management, it is required to write, on the spot, in the tag attached to each of the products, information of a production line and a date and time, etc. However, the time required to write data in a tag is usually much longer than the time required to read data. Accordingly, if it takes too much time to write data, waiting time for writing in the tag is required, whereby the manufacturing capability of the production line may be reduced. In addition, in the case where tags are utilized for realizing traceability of food articles and SCM (Supply-Chain Management), each article requires the tag; therefore, a great number of tags are utilized and even when data is written in the tag before the tag is attached to the article, high-speed writing is required.

However, tags have just recently been put into practice; therefore, no specific proposal has been made that relates to a writing apparatus for implementing high-speed writing.

The present invention has been invented in consideration of these problems. It is a main object of the present invention to provide a non-contact ID tag writing apparatus for writing data at high speed in writable non-contact ID tags.

Means for Solving the Problems

In other words, an aspect of the present invention exists in a non-contact ID tag writing apparatus for writing predetermined data in a plurality of non-contact ID tags transported in a predetermined transportation direction, the non-contact ID tag writing apparatus comprising: a plurality of writing units, arranged along the transportation direction, each including an antenna for communicating with the plurality of non-contact ID tags, adapted to write predetermined data in the non-contact ID tags existing within the coverage areas of the antennas; and a selection unit adapted to control the operation of the plurality of non-contact ID tags so that, at an arbitrary time point, only one non-contact ID tag among the plurality of non-contact ID tags existing within a coverage area of respective antennas of the writing unit can communicate with a corresponding antenna, wherein the selection unit make the non-contact ID tags that are allowed to communicate with the corresponding antennas differ from one another, depending on the respective antennas of the plurality of writing units.

Additionally, another aspect of the present invention exists in a non-contact ID tag writing apparatus comprising: an alignment unit, in a transportation path for an article to which a non-contact ID tag is attached, adapted to align a plurality of the articles; a writing unit adapted to write predetermined data concurrently in a plurality of non-contact ID tags attached to the aligned plurality of the articles; and a reading unit, provided at a position lower in the transportation path than that of the writing unit, adapted to read the respective non-contact ID tags of the articles so as to check whether or not the predetermined data has been written correctly.

Effects of the Invention

A configuration as described above makes it possible to write data at high speed in writable non-contact ID tags. Other features and advantages of the present invention will be evident from the following description with reference to the accompanying drawings. In addition, in the accompanying drawings, the same or similar constituent elements are indicated by the same reference numerals.

BEST MODE FOR CARRYING OUT THE INVENTION

The present invention will be explained in detail below, in accordance with preferred embodiments, with reference to the drawings.

First Embodiment

Figure 1:
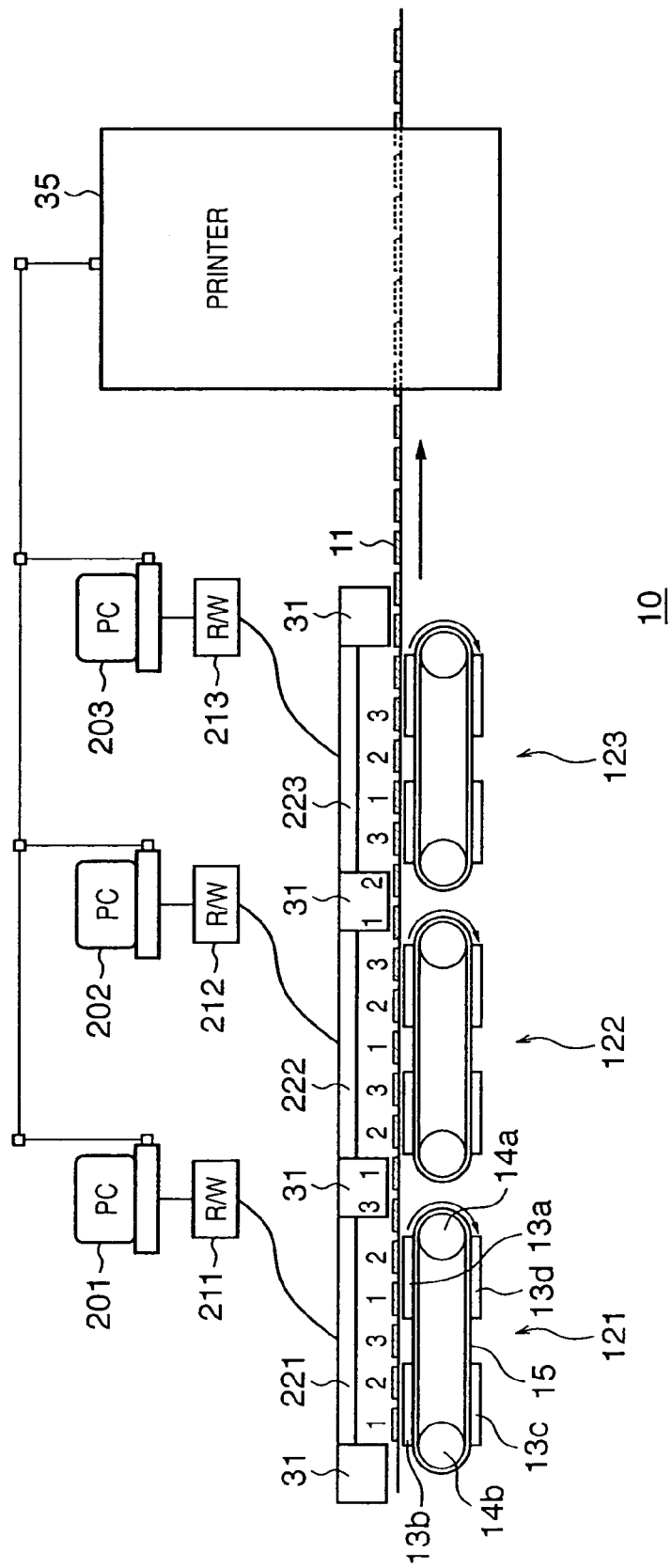
FIG. 1 is a view illustrating an example of the configuration of a non-contact ID tag writing apparatus according to a first embodiment of the present invention.

FIG. 1 is a side view illustrating an example of the principal configuration of a non-contact ID tag writing apparatus according to a first embodiment of the present invention.

In FIG. 1, a non-contact ID tag writing apparatus 10 includes PC's (personal computers) 201 to 203, reader/writers 211 to 213, antennas 221 to 223, tag selection units 121 to 123, electromagnetic shield members 31, and a printer 35 for printing a logo and the like on a tag in which data has been written.

The PC's 201 to 203 are (host) computers for supplying the reader/writers 211 to 213 with data to be written in tags, obtaining data that are read by the reader/writers 211 to 213 from tags, and issuing commands to the reader/writers 211 to 213, in accordance with the contents of the obtained data; the PC's 201 to 203 are communicatably connected with one another. The reader/writers (R/W) 211 to 213 are wireless transceivers for modulating a predetermined radio-frequency signal with data, commands, and the like received from the PC's to supply the antennas 221 to 223 with the modulated signals, and for demodulating signals received from the antennas 221 to 223 to output to the PC's 201 to 203.

The antennas 221 to 223 have a predetermined length in a direction (to the right-hand direction in FIG. 1) in which tags are transported and supply RF signals to tags, which are transported closely under the antennas. The non-contact ID tag writing apparatus is configured in such a way that, by providing at the ends of antennas 221 to 223 the electromagnetic shield members 31 formed of electric conductors, a tag, which is supposed to respond only to the electromagnetic wave (an RF signal) from a specific antenna, is prevented from responding to an RF signal emitted from the antenna(s) adjacent to the specific antenna. Moreover, in FIG. 1, the electromagnetic shield members 31 are provided at both ends of the antenna so as to prevent a tag, which exists in a region that is not affected by the operational restriction through the electric conductor, described later, of the tag selection unit, from responding to an RF signal from the antenna. It should be noted that the arrangement position and the shape of the electromagnetic shield member 31 may arbitrarily be determined, as long as the foregoing objectives are achieved.

In the first embodiment, the tag selection units 121 to 123 are belt conveyors each of which has a configuration in which a belt 15 that is supported, at the inner periphery thereof, by a pair of rollers 14a and 14b is transported in the direction indicated by the arrow. Electric conductors 13a to 13d are provided periodically on the outer periphery of the belt 15. In the first embodiment, tags 11, which are sticker-like and continually formed on a long release paper, are transported at a constant speed from the left to the right in FIG. 1.

Next, the operational principle and the specific operation of the non-contact ID tag writing apparatus 10 according to the first embodiment will be explained. As described above, it takes a considerably long time to write data in a non-contact ID tag, compared with reading data from a non-contact ID tag. Additionally, from the start to the end of writing, the tag is required to be within the reception region where an electromagnetic wave emitted from the antenna of the reader/writer can be received.

Accordingly, in the case where, e.g., because the antenna is too small, the reception region is small, or in the case where the transportation speed is too fast, a situation in which the tag cannot stay within the reception region for a time necessary for writing processing may occur. Therefore, for example, in the case where data is written in each of the tags continually formed as illustrated in FIG. 1, control is required in which, when a writing-subject tag enters the reception region, the transportation of the tag is temporarily stopped, writing is implemented, and then the transportation is resumed.

However, in the case where, e.g., in a production line for articles, it is required to write data in real time in a tag attached to the article to be transported, the stop of tag transportation suggests the stop of article transportation and therefore can be accepted by no means. Therefore, in the first embodiment, the non-contact ID tag writing apparatus has a configuration as illustrated in FIG. 1 so that writing in tags being transported can be implemented in real time and without stopping the transportation.

Specifically, a plurality of writing mechanisms (in FIG. 1, each mechanism is configured of a set of a PC, a reader/writer, and an antenna and implements reading data from tags and writing data in tags; even though, for convenience, it is referred to as the writing mechanism, it can also implement reading) are arranged along a direction in which tags are transported; each antenna has a predetermined length in the tag-transportation direction so that a tag exists within the reception region throughout the time necessary for writing processing. However, when the antenna widely emits an electromagnetic wave, a problem is posed in which a plurality of continually formed tags respond to the electromagnetic wave, whereby more time is required than that required in the case where only one tag responds. Therefore, in the first embodiment, by utilizing the tag selection units 121 to 123, one antenna is always responded to by one tag only.

As described above, in the first embodiment, each of the tag selection units 121 to 123 has the belt 15 on the outer periphery of which the electric conductors 13a to 13d are periodically arranged. In the first embodiment, in order to utilize the characteristic that, even though being within the reception region for an electromagnetic wave from the antenna, a tag in the vicinity of which the electric conductor exists does not operate, thereby allowing only one tag, among a plurality of tags that is transported under the antenna, to receive the electromagnetic wave from the antenna, the positions of the electric conductors 13a to 13d are controlled.

Figure 2:
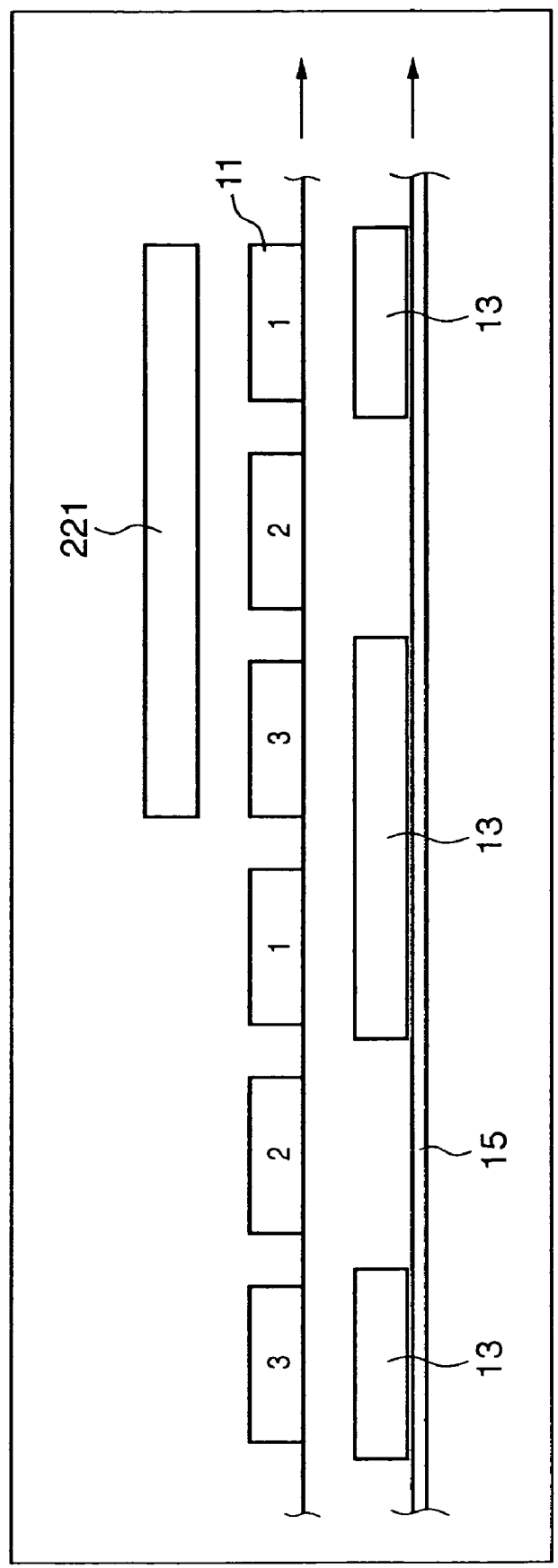
FIG. 2 is a view for explaining the operation of a non-contact ID tag writing apparatus according to the first embodiment of the present invention.

This point will be further explained with reference to FIG. 2. FIG. 2 is a view illustrating the arrangement of the electric conductors 13 in the case where three consecutive tags exist within the coverage area of a single antenna. In addition, in FIG. 2, for the better understanding, the belt 15 is drawn as an exploded view. The belt 15 is controlled by an unillustrated control means so as to move at the same speed as the moving speed (transportation speed) of the tag 11. Additionally, the electric conductors 13 are provided on the belt 15 in such a way as to avoid the position corresponding to one (in this case, a tag "2") of three tags that exist within the coverage area of the antenna 221. As described above, the distance between the neighboring electric conductors 13 and the sizes of the electric conductors 13 are determined, always in such a way that, during transportation of tags, only one tag can communicate with a single antenna at a constant interval.

As described above, in the first embodiment, writing through a single antenna is applied to one out of three tags to be transported; therefore, by providing three sets of writing mechanisms and determining the arrangement of the electric conductors 13 of the tag selection units 121 to 123, e.g., in such a way that writing through the antenna 221 is applied to the tags "2", writing through the antenna 222 is applied to the tags "1", and writing through the antenna 223 is applied to the tags "3", data can be written in all the tags.

In addition, as those skilled in the art will readily appreciate, the number of sets of writing mechanisms to be provided may be appropriately determined based on the transportation speed for the tags 11 and the time necessary for writing in the tag 11. In other words, letting d denote the transportation distance corresponding to the duration from the time point at which a specific tag and a specific antenna start to communicate with each other to the time point at which writing is completed, and letting n denote the number of tags included in d, the single antenna can apply writing to one out of n consecutive tags; therefore, by providing n sets of writing mechanisms, writing can be applied to all the tags. Additionally, the coverage area, in the transportation direction, of each antenna is set to be approximately the same as the transportation distance d so that, immediately after receiving writing, the tag can be transported to the outside of the coverage area. In addition, "the coverage area of an antenna" here may be the inherent performance of the antenna or coverage that is restricted through, e.g., the electromagnetic shield members 31, compared with the actual coverage area.

The writing operation of each writing mechanism in the non-contact ID tag writing apparatus 10 according to the first embodiment may be implemented in accordance with well-known protocols that have conventionally been employed. Additionally, data that are written in tags through the writing mechanisms may be different from or the same as one another. Additionally, an unillustrated transportation means for transporting the tags 11 at a constant speed and the printer 35 may be included or not included in the configuration of the non-contact ID tag writing apparatus 10 according to the first embodiment.

In addition, in the first embodiment, for the electric conductor 13 utilized for selecting (limiting) a tag that is allowed to communicate with the antenna, not only metal but also an arbitrary material, such as conductive resin, can be utilized that is electroconductive enough to restrict the operation of the corresponding tag. Additionally, the cross-sectional shape of the electric conductor 13 may be not only plate-like but also otherwise-shaped.

Figure 3A:
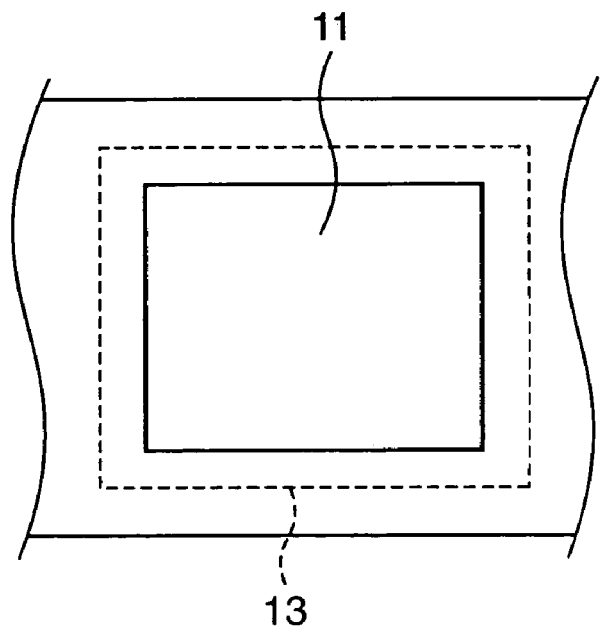
FIG. 3A is view for explaining the arrangement and the size of an electric conductor 13.
Figure 3B:
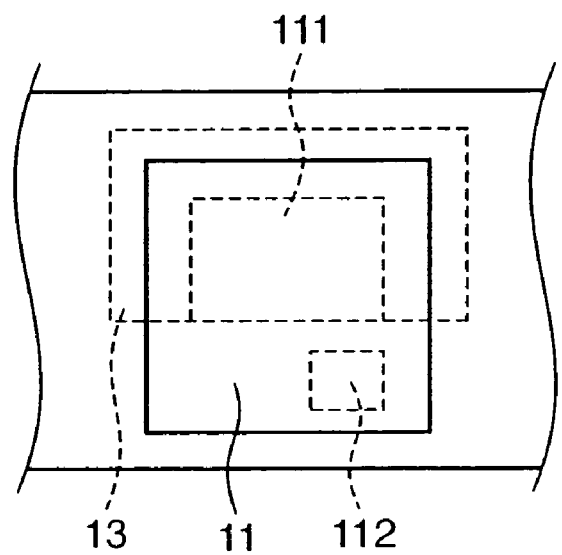
FIG. 3B is view for explaining the arrangement and the size of an electric conductor 13.

FIGS. 3A and 3B are top views each illustrating an example of arrangement of the electric conductor 13 and the tag 11. FIG. 3A illustrates an example in the case where the electric conductor 13 having a size that is wide enough to cover the entire surface of the tag 11 is utilized. In contrast, FIG. 3B illustrates an example in the case where the electric conductor 13 having a size that is wide enough to cover part of the entire surface of the tag 11 is utilized. In the case of a so-called passive tag that has no operational power source and whose circuit 112 such as a memory is operated with a voltage created from an electromagnetic wave received through an antenna 111, the operation of the tag can be limited by covering at least part of the antenna 111, to the extent in which the operational power source cannot be generated. If the circuit arrangement in the tag 11 to be transported is preliminarily known, the size of the electric conductor 13 may be determined as illustrated in FIG. 3B.

As described above, according to the first embodiment, data writing in non-contact ID tags can be implemented without stopping the transportation of the non-contact ID tags and at high speed.

Moreover, because data can be written in tags one by one, respective data, corresponding to the tags, that differ from one another can be written.

In addition, in the first embodiment, as an example of a configuration for selecting a tag (or limiting the operation of tags other than a single tag) that is allowed to communicate with each corresponding antenna, a configuration has been explained in which electric conductors are arranged in the vicinity of tags; however, it goes without saying that, as long as the same function can be achieved, other arbitrary configurations may be utilized in accordance with the type of tags.

First Variation of the First Embodiment

Figure 4:
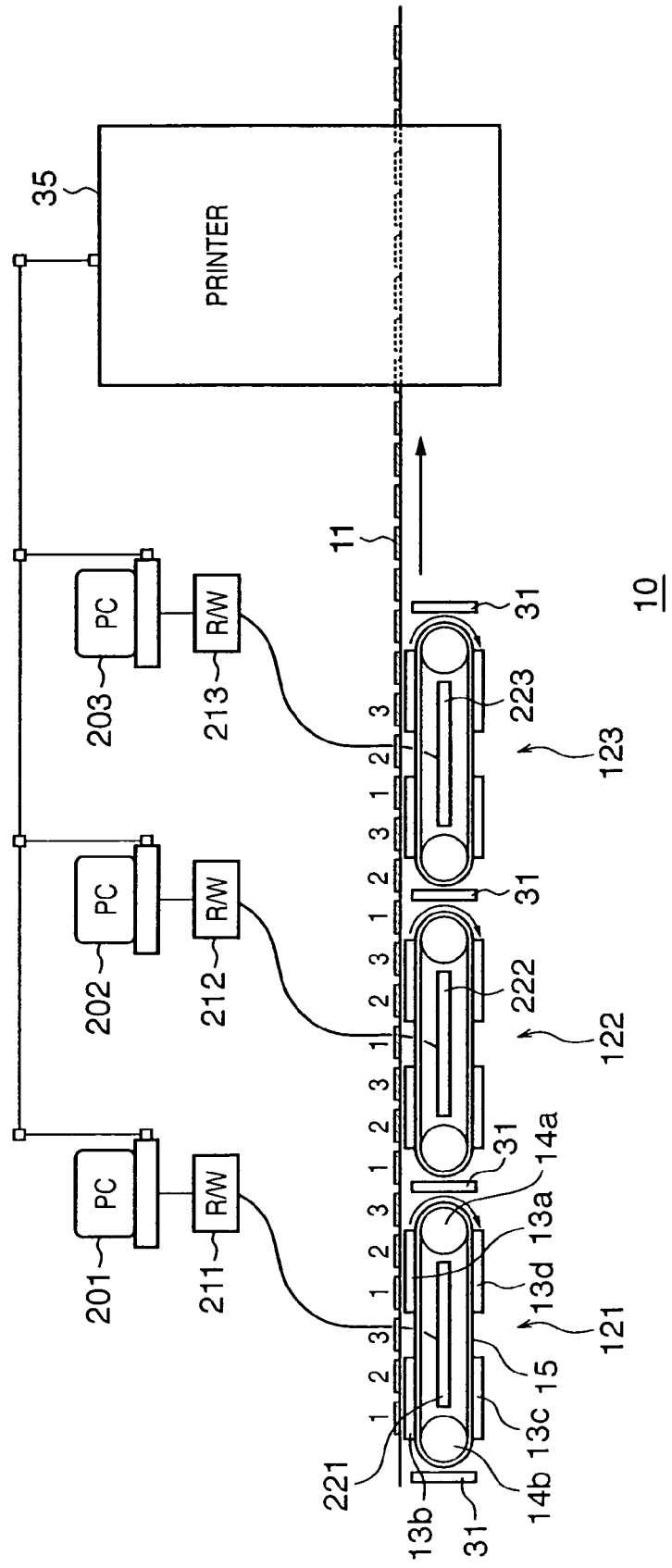
FIG. 4 is a view illustrating an example of the configuration of a non-contact ID tag writing apparatus according to a first variation of the first embodiment of the present invention.

In the foregoing example, a configuration has been explained in which the antenna 221 to 223 are arranged in such a way that the tag 11 is interposed between the electric conductor 13 and each of the antenna 221 to 223 and each of the antenna 221 to 223 faces the electric conductor 13; however, e.g., as illustrated in FIG. 4, each of the antenna 221 to 223 may be arranged behind the electric conductors 13, when viewed from the tag 11. In this case, connection between the reader/writers 211 to 213 and the respective antennas 221 to 223 can be made through the side plane of the corresponding tag selection units 121 to 123. In addition, the electromagnetic shield member 31 is provided, e.g., between the tag selection units 121 to 123. The configuration as described above can demonstrate the same effect as that in the case of the configuration in FIG. 1.

Second Variation of the First Embodiment

In writing procedures for a non-contact ID tag, a communication procedure may exists in which, in particular, in the case where different data is written in each tag, inherent information (e.g., an ID number) preliminarily stored in each tag is obtained in the first place so as to identify the tag to be communicated with. The communication procedure can be omitted when the inherent information of a tag is known; therefore, writing time can be shortened by the time corresponding to the omitted communication procedure. In a second variation of the first embodiment, by obtaining and utilizing in respective writing mechanisms the inherent information of tags, the reduction of writing time is realized.

Figure 5:
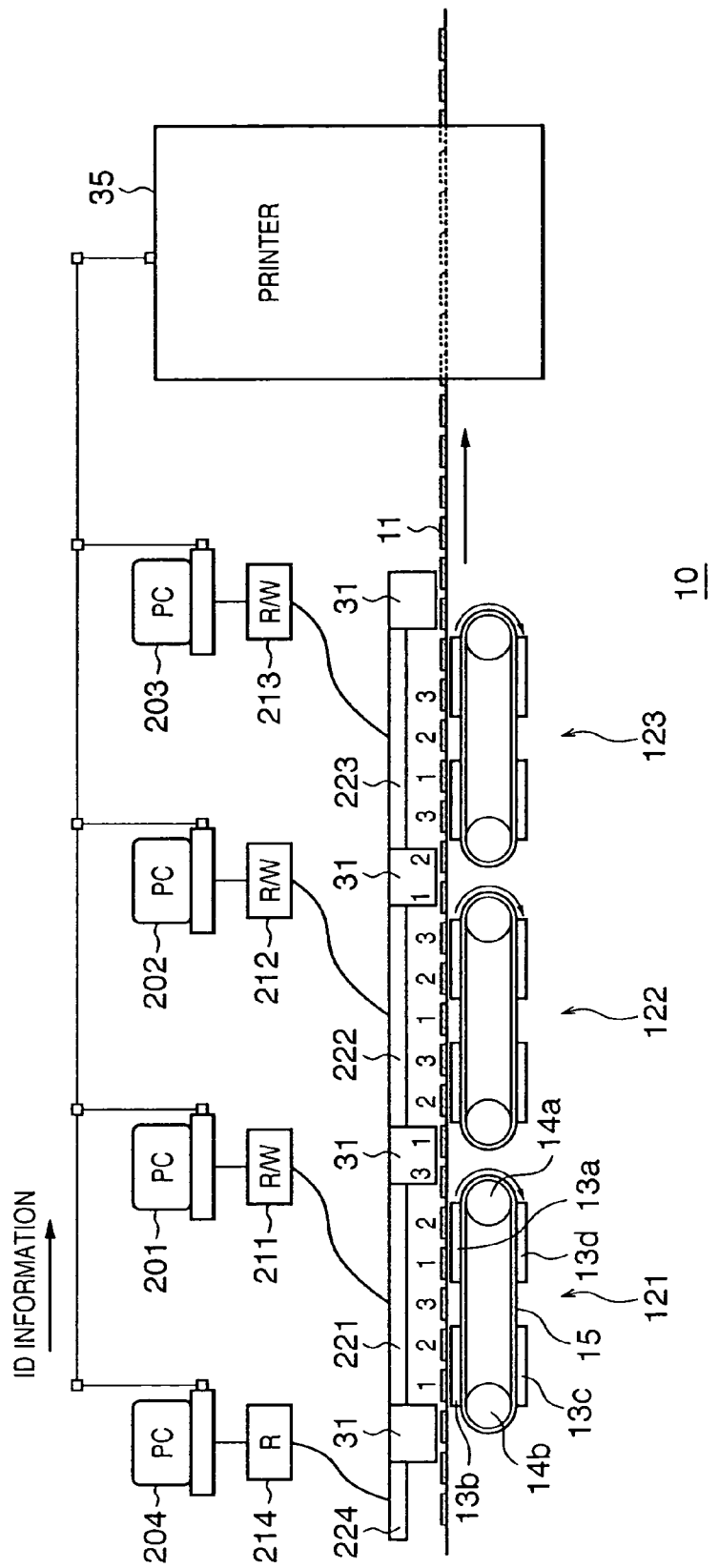
FIG. 5 is a view illustrating an example of the configuration of a non-contact ID tag writing apparatus according to a second variation of the first embodiment of the present invention.

For example, as illustrated in FIG. 5, a reading mechanism consisting of an antenna 224, a reader 214, and a PC 204 is provided at the stage before the transportation path. In addition, the reading mechanism may have the same configuration as that of the foregoing writing mechanism.

In addition, as described above, data reading from the tag 11 can be implemented at a sufficiently high speed, compared with data writing; therefore, without providing any tag selection unit, data can be read from each tag through the antenna 224. Additionally, the read inherent information is supplied to the respective PC's 201 to 203 in three sets of writing mechanisms. It goes without saying that, in this situation, the inherent information corresponding to the respective tags that are treated by the writing mechanisms are supplied to the corresponding PC's 201 to 203. In other words, explaining with reference to FIG. 5, e.g., in the case where writing through the antenna 221 is applied to tags "2", writing through the antenna 222 is applied to tags "1", and writing through the antenna 223 is applied to tags "3", the inherent information read from the tag "2", the inherent information read from the tag "1", and the inherent information read from the tag "3" are supplied to the PC 201, the PC 202, and the PC 203, respectively. Partner-designated inter-computer communication methods are well known and have no relationship with the nature of the present invention; therefore, explanations therefor will be omitted.

With the foregoing configuration, writing processing can be implemented by utilizing preliminarily obtained inherent information of tags, whereby the communication procedure for obtaining the inherent information can be omitted; therefore, writing time can be shortened. Accordingly, in addition to the foregoing effect, downsizing of the antenna or enhancement of the transportation speed can be realized.

Second Embodiment

Figure 6:
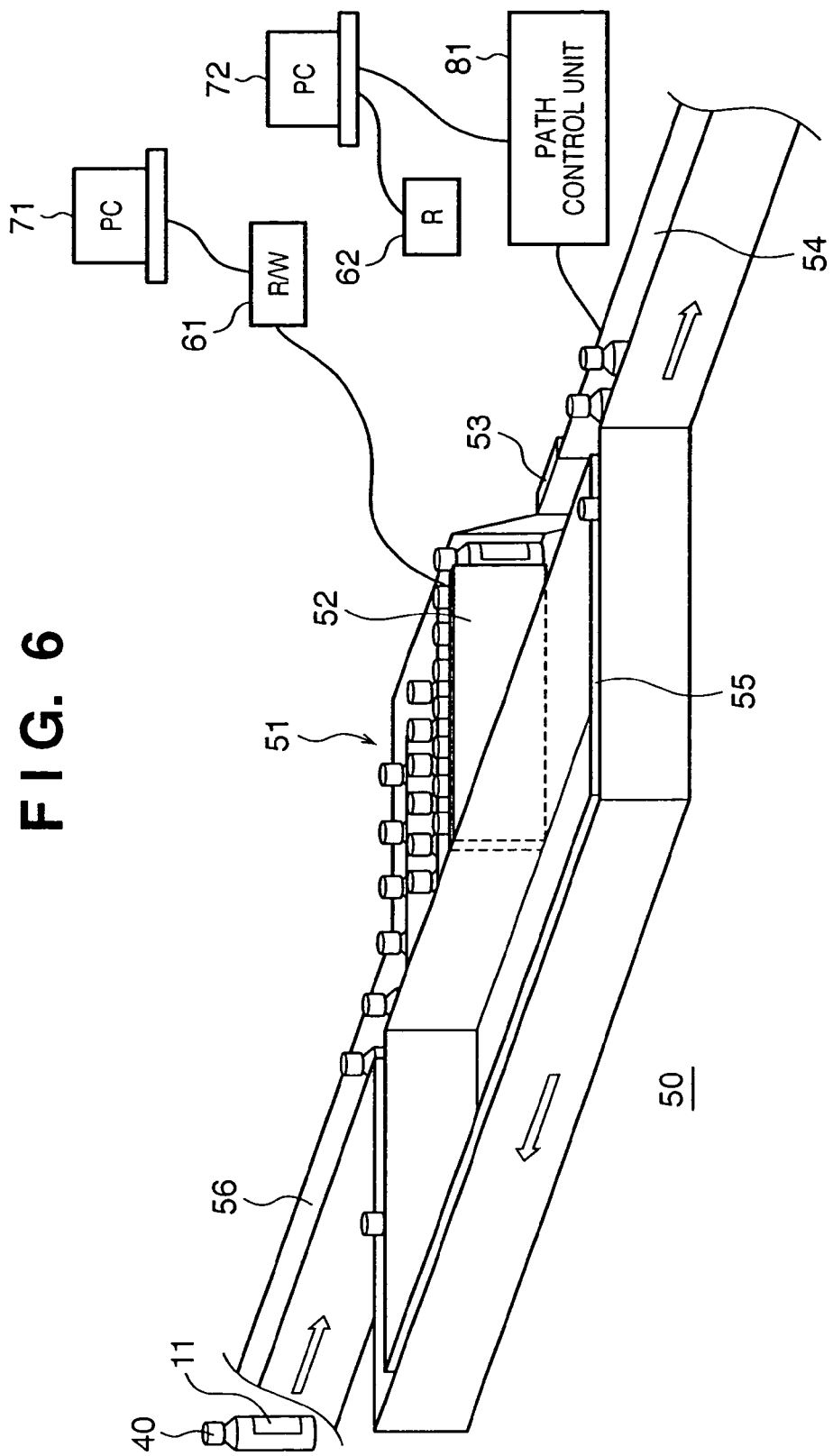
FIG. 6 is a view illustrating an example of the configuration of a non-contact ID tag writing apparatus according to a second embodiment of the present invention.

Next, a second embodiment of the present invention will be explained. FIG. 6 is a view typically illustrating an example of the configuration of a non-contact ID tag writing apparatus according to the second embodiment. The configuration of the non-contact ID tag writing apparatus according to the second embodiment differs from that of the non-contact ID tag writing apparatus according to the first embodiment in that only one antenna is utilized and common data is written concurrently in a plurality of tags.

In addition, here, a case will be explained in which a non-contact ID tag writing apparatus 50 according to the second embodiment applies writing to the tags 11 that, as labels, are attached to bottle-shaped articles; however, the shape of the article, the attachment position and the attachment method for the tag are not limited in particular.

In FIG. 6, the non-contact ID tag writing apparatus 50 is provided in the transportation path for articles 40. The article 40 to which the tag 11 is attached passes through an inflow path 56 and an alignment section 51 and transported through an outflow path 54 to the next process. An arbitrary mechanism for transporting the article 40 through the foregoing paths can be employed; the articles may be positively transported, e.g., by a vibrating feeder or a conveyor, or the articles may be moved by gravity, e.g., by making the inflow-path side to be higher than the outflow-path side. Additionally, a plurality of transportation methods may be combined, or an originally installed transportation apparatus may be applied to the non-contact ID tag writing apparatus, except for the alignment section 51.

The articles 40 are aligned in the process of passing through the alignment section 51, whereby, in front of the antenna 52, the articles 40 are transported in a row. The writing mechanism consisting of the antenna 52, a reader/writer 61, and a PC 71 writes the same data concurrently in the tags 11 attached to a plurality of the articles 40 that exists in front of the antenna 52. The article 40 that has passed before the antenna 52 passes before an antenna 53 in the process of heading for the outflow path 54. The reading mechanism consisting of the antenna 53, a reader/writer 62, and a PC 72 reads the respective tags 11 attached to the articles 40 so as to check whether or not the writing through the antenna 52 has been implemented normally.

In the case where, by checking, e.g., whether or not data written through the writing mechanism and data read through the reading mechanism coincide with each other, it is confirmed that the writing has been implemented normally, the article 40 is transported through the outflow path 54 to the next process without implementing anything. In contrast, in the case where it is determined that the writing has not been completed normally, the PC 72 controls a path control unit 81 so that the article 40 having the tag 11 in which data has not been written correctly is sent to a retry path 55 instead of the outflow path 54. The retry path 55 is a transportation means for returning the article 40 from a position that is lower, in the transportation path, than the reading mechanism to a position that is upper, in the transportation path, than the alignment section 51; the article 40 that has been sent into the retry path 55 is transported upstream and returned into the inflow path 56, in the vicinity of the alignment section 51.

Figure 7:
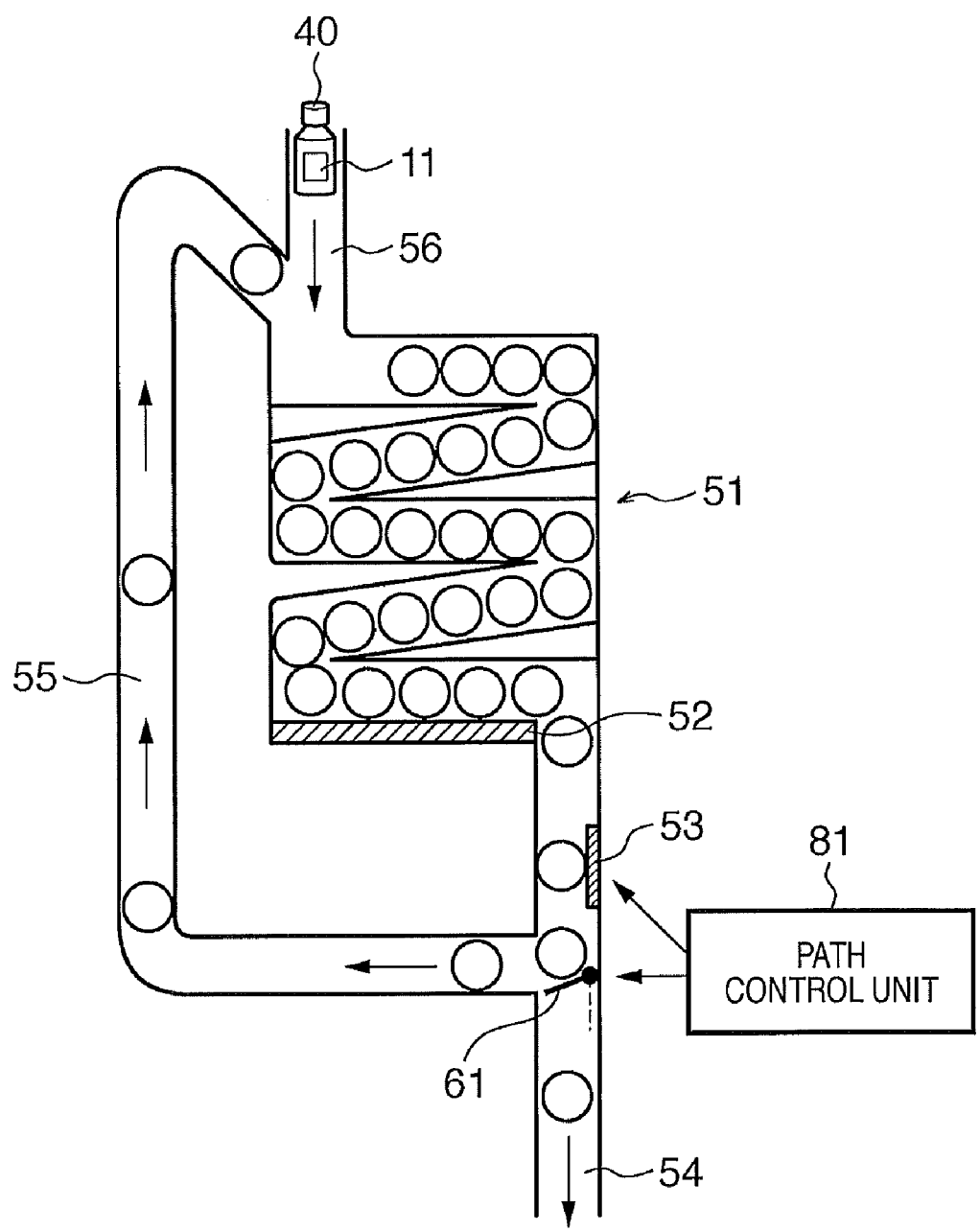
FIG. 7 is a view illustrating an example of the configuration of a non-contact ID tag writing apparatus according to the second embodiment of the present invention.

FIG. 7 is a top view illustrating the flow of the articles 40 in FIG. 6. The articles 40 that have been transported downstream are aligned in the alignment section 51 having a meandering path, in such a way that the row of the articles 40 has a width that is at least the same as, or longer than, the width of the antenna 52. Then, data writing is implemented as the articles 40 pass before the antenna 52. In this case, the same data are written concurrently in all of the tags 11 (more correctly, the write command is given concurrently to a plurality of the tags 11). The foregoing concurrent writing, through a single antenna, in a plurality of tags can be implemented by utilizing a well-known method (e.g., the write command specified in ISO/IEC15693 enables the concurrent writing). In this case, the writing mechanism transmits, e.g., periodically, the write command that does not designates the tag to be communicated with, and the tags that have received the write command implement writing. Because, if the same tag receives the write command plural times, the efficiency is lowered, and thus the transmission period for the write command is appropriately determined in accordance with the transportation speed of the articles 40.

When it is determined that the writing through the antenna 53 has not been implemented correctly, the PC 72 controls the path control unit 81 so as to change the position of the path switching plate 61. The path switching plate 61 is configured, e.g., in such a way that the two states indicated by the solid line and the dotted line in FIG. 7 can be switched; for the articles 40 to which writing has not been applied normally, the path switching plate 61 is controlled so as to be at the solid-line position, and for the articles 40 to which writing has been applied normally, the path switching plate 61 is controlled so as to be at the dotted-line position. Accordingly, the articles 40 to which writing has not been applied normally are transported along the path switching plate 61 to the retry path 55 and then returned to the inflow path 56 in the vicinity of the alignment section 51.

The reading mechanism ascertains the result of writing and articles having tags to which the writing has not been applied correctly are treated again; therefore, even though, e.g., due to fluctuation in the transportation speed, unevenness in the orientations of the articles (the distance and angular relationships between the tag and the antenna), or the like, tags that cannot receive the write command exist, secure writing is implemented eventually.

As described above, according to the second embodiment, by applying collective writing processing to a plurality of tags, data writing can be implemented without stopping the transportation of articles and at high speed.

Variation of the Second Embodiment

In FIGS. 6 and 7, the non-contact ID tag writing apparatus is configured in such a way that articles pass before the antenna 52 and are taken out in turn; however, a configuration may be employed in which a predetermined number of articles, as a processing unit, are transported up to the antenna 52, and processing is implemented unit after unit, i.e., so-called batch processing is implemented.

Figure 8:
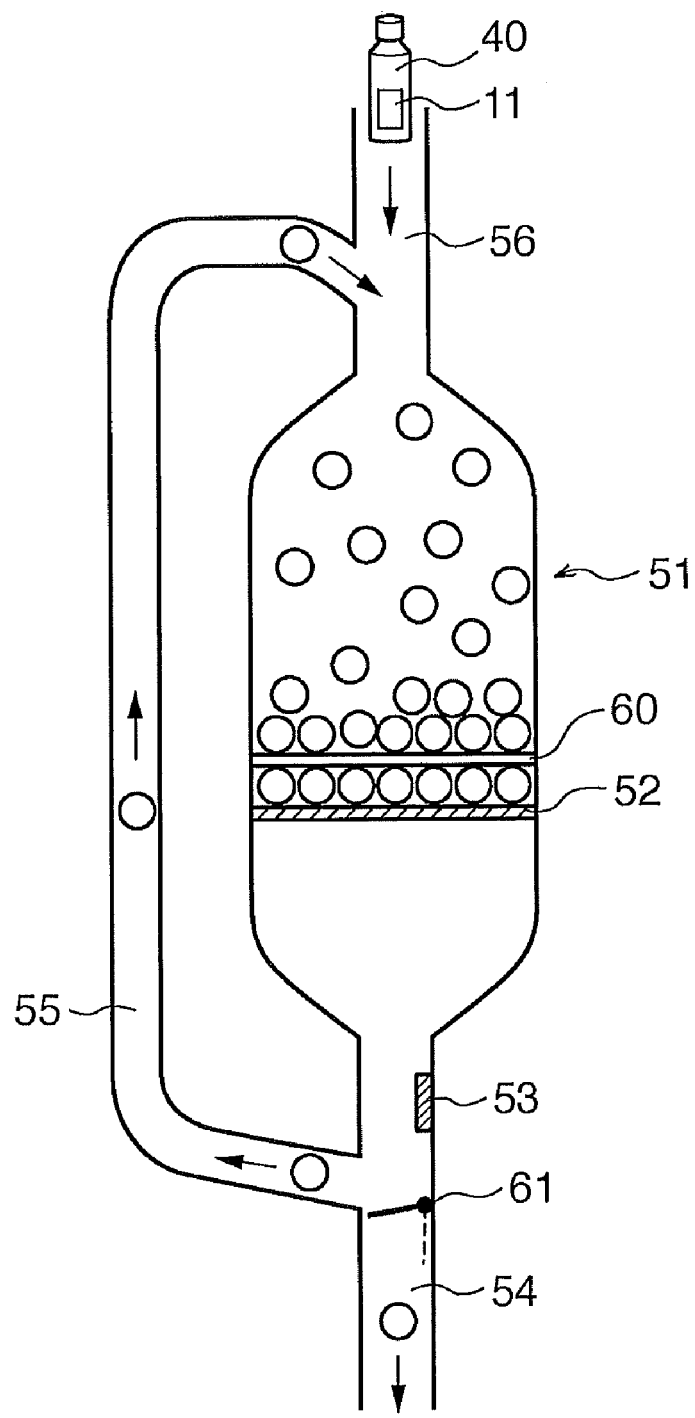
FIG. 8 is a view illustrating an example of the configuration of a non-contact ID tag writing apparatus according to a first variation of the second embodiment of the present invention.
Figure 9:
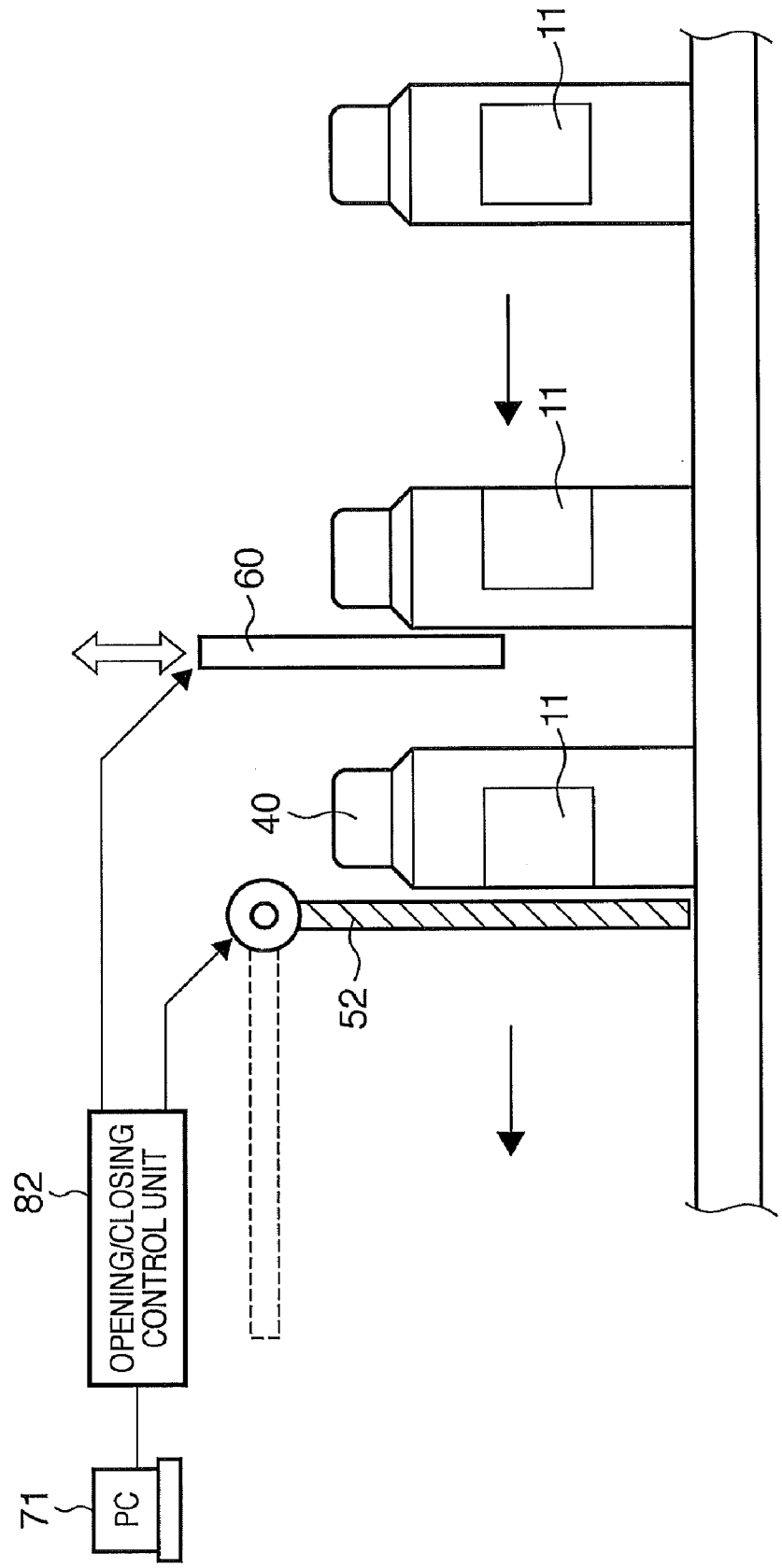
FIG. 9 is a view illustrating an example of the configuration of a non-contact ID tag writing apparatus according to the first variation of the second embodiment of the present invention.

FIG. 8 is a view illustrating an example in which that configuration is applied to the non-contact ID tag writing apparatus; FIG. 9 is a view typically illustrating an example of the configuration, viewed from side, in the vicinity of the antenna 52 in FIG. 8. The article 40, having the tag 11, that has been transported through the inflow path 56 flows into the alignment section 51 having a gate 60. In a variation of the second embodiment, the alignment section 51, having approximately the same width as that of the antenna 52, is simply configured. The gate 60 moves upward and downward at a predetermined period. When the gate is situated at the lower position, the articles 40 are obstructed by the gate 60 from reaching the antenna 52. Accordingly, the articles 40 are aligned in the longitudinal direction of the antenna 52, along the gate 60. In contrast, when the gate 60 moves upward, the articles 40 are allowed to move toward the antenna 52. After a time elapses during which approximately a row of the articles 40 passes under the gate 60, the gate 60 moves downward again, thereby obstructing the articles 40 from moving toward the antenna 52.

The upward and downward movement of the gate 60 makes in front of the antenna 52 a row of the articles 40 in the number that approximately corresponds to the width of the antenna 52. Then, writing processing is applied to the articles through the antenna 52. The writing processing is applied collectively to a plurality of tags, as described above.

After the writing processing is completed, the antenna 52 pivots to the position indicated by a dotted line in FIG. 9. Accordingly, the articles situated between the antenna 52 and the gate 60 are transported downstream beyond the antenna 52. After a predetermined time elapses, the antenna 52 returns to the previous position (the position indicated by the solid lines in FIG. 9), and the gate 60 moves upward. By repeating the processes, the writing processing is applied to a plurality of tags. Also in the variation of the second embodiment, the tags that have not received the write command correctly are transported to the retry path 55, based on the writing-result check at a lower position in the transportation path, and the writing is implemented again; therefore, no problem is posed.

In addition, the upward and downward movement of the gate 60 and the pivoting movement of the antenna 52 can be realized through an arbitrary configuration utilizing a well-known driving source such as a motor or an actuator. Additionally, the foregoing movement control is implemented by an opening/closing control unit 82, in accordance with the control by the PC 71.

With the configuration according to the variation of the second embodiment, the number of the articles 40 to be interposed between the antenna 52 and the gate 60 is not necessarily constant, and in some cases, the articles 40 may be situated in such a way as to be stacked on top of one another. Additionally, as is the case with the configurations in FIGS. 6 and 7, the distance between the antenna 52 and the tag 11 of each article 40 varies (differs depending on the orientation of the article); therefore, it is not necessarily ensured that writing processing is applied normally to all the tags.

Therefore, as is the case with the configurations in FIGS. 6 and 7, at a lower position in the transportation path, the result of the writing is checked by utilizing the antenna 53, and the articles 40 having the tags 11 to which the writing has not been applied correctly receive the writing processing again while being transported through the retry path 55.

Also according to the variation of the second embodiment, data writing in tags attached to articles can be implemented through a simple configuration, without stopping the transportation of the articles and at high speed.

Other Embodiment

In addition, the first and the second embodiments described above can be combined with each other. In general, the reading from and writing in the memory of a non-contact ID tag is implemented per unit called a "page"; an embodiment is conceivable in which writing according to the first embodiment is applied to the page in which information that differs between tags is required to written, and then writing of common data, according to the second embodiment, is applied to another page of the tag. It is to be understood that the present invention is not limited to the foregoing embodiments, and various modifications to the foregoing embodiments may be implemented without departing from the spirit and scope of the present invention. Thus, in order to make public the scope of the present invention, the following claims are attached.

CLAIM OF PRIORITY

The present application claims priority from Japanese Patent Application No. 2004-073203, filed Mar. 15, 2004, which is incorporated herein, in its entirety, by reference.

The invention claimed is:

1. A non-contact ID tag writing apparatus for writing predetermined data in a plurality of non-contact ID tags transported on a common carrier moved in a predetermined transportation direction, the non-contact ID tag writing apparatus comprising:
a plurality of writing units, arranged along with the common carrier in the transportation direction at regular intervals, each including an antenna coverage area of which simultaneously includes at least two of the plurality of non-contact ID tags on the common carrier, each adapted to emit from the antenna an RF signal to write predetermined data into said at least two of the plurality of non-contact ID tags existing within the coverage areas of the antennas; and
a selection unit adapted to control the location of the plurality of non-contact ID tags within the coverage area so that, at an arbitrary time point, only one non-contact ID tag of said at least two of the plurality of non-contact ID tags existing within a coverage area of respective antennas of the plurality of writing units can communicate with a corresponding antenna, and so that non-contact ID tags other than said one non-contact ID tag among said at least two of the plurality of non-contact ID tags existing within the coverage area of the corresponding antenna cannot communicate with the corresponding antenna, by moving electric conductors in a corresponding vicinity of each of said other non-contact ID tags at a same speed and direction of the common carrier to prevent reception of electromagnetic waves from the corresponding antenna,
wherein the selection unit ensures that the predetermined data is written in each of the plurality of non-contact ID tags by only one of the plurality of writing units during transport.

2. The non-contact ID tag writing apparatus according to claim 1, wherein the selection unit periodically allows one of the predetermined number of non-contact ID tags in series to communicate with the corresponding antenna.

3. The non-contact ID tag writing apparatus according to claim 1, further comprising a reading unit, provided before the plurality of writing units along the transportation direction, adapted to read respective inherent information of each of the plurality of the non-contact ID tags, and to provide the inherent information to the plurality of writing units, wherein the plurality of writing units write the predetermined data by utilizing the respective inherent information read by the reading unit.

4. The non-contact ID tag writing apparatus according to claim 2, further comprising a reading unit, provided before the plurality of writing units along the transportation direction, for reading respective inherent information of the plurality of the non-contact ID tags transported, wherein the plurality of writing units write the predetermined data by utilizing the respective inherent information read by the reading unit.

* * * * *